US012651193B2

(12) United States Patent
Wang et al.

(10) Patent No.: US 12,651,193 B2
(45) Date of Patent: Jun. 9, 2026

(54) MACHINE LEARNING WITH SEGMENT-ALIGNED MULTISENSOR TRACE DATA

(71) Applicant: International Business Machines Corporation, Armonk, NY (US)

(72) Inventors: Yu Ying YY Wang, Xi'an (CN); Zhi Yong Jia, Xian (CN); Jing Wu, Xian (CN); Rong Fu He, Xian (CN)

(73) Assignee: International Business Machines Corporation, Armonk, NY (US)

( * ) Notice: Subject to any disclaimer, the term of this patent is extended or adjusted under 35 U.S.C. 154(b) by 1512 days.

(21) Appl. No.: 16/164,999

(22) Filed: Oct. 19, 2018

(65) Prior Publication Data

US 2020/0125995 A1 Apr. 23, 2020

(51) Int. Cl.
| | |
|---|---|
| *G06N 20/00* | (2019.01) |
| *G05B 13/02* | (2006.01) |
| *G06Q 50/04* | (2012.01) |

(52) U.S. Cl.
CPC ......... G06N 20/00 (2019.01); G05B 13/0265 (2013.01); *G06F 2212/462* (2013.01); *G06Q 50/04* (2013.01)

(58) Field of Classification Search
CPC .............................. G06N 20/00; G06Q 50/04
See application file for complete search history.

(56) References Cited

U.S. PATENT DOCUMENTS

| | | | |
|---|---|---|---|
| 8,437,870 B2 | 5/2013 | Tsai et al. | |
| 8,594,826 B2 | 11/2013 | Aharoni et al. | |
| 9,075,713 B2 | 7/2015 | Jones | |
| 9,146,800 B2 | 9/2015 | Jones | |
| 2011/0282828 A1* | 11/2011 | Precup | G06V 40/25 |
| | | | 706/54 |
| 2015/0012255 A1 | 1/2015 | Li | |

(Continued)

FOREIGN PATENT DOCUMENTS

| | | |
|---|---|---|
| CN | 103150364 A | 6/2013 |
| WO | 2015176565 A1 | 11/2015 |

OTHER PUBLICATIONS

Lavielle, Detection of multiple changes in a sequence of dependent variables (Year: 1999).*

(Continued)

*Primary Examiner* — Tewodros E Mengistu
(74) *Attorney, Agent, or Firm* — CHIP LAW GROUP

(57) ABSTRACT

A machine-learning system receives from multiple sensors a set of trace-data time series. Each time series contains a chronological sequence of sensor measurements of one attribute of one instance of a manufacturing product or process. The system partitions each series into a set of contiguous segments and selects one received series to be a standard series for each attribute. The starting and ending measurements of each non-standard time series are then time-aligned to the starting and ending points of the non-standard series' corresponding standard series, using a dynamic time-warping procedure. One or more segments of each aligned non-standard series are then aligned to each segment of the corresponding standard series. The resulting time-aligned, segmented time series are then incorporated into a corpus that is used by a machine-learning module to train a self-learning application.

11 Claims, 7 Drawing Sheets

(56)             References Cited

U.S. PATENT DOCUMENTS

| | | | | |
|---|---|---|---|---|
| 2016/0110478 A1* | 4/2016 | Aggour | ................. | G06F 16/904 |
| | | | | 707/755 |
| 2017/0109646 A1 | 4/2017 | David | | |
| 2017/0343999 A1 | 11/2017 | Iskandar et al. | | |
| 2018/0211181 A1* | 7/2018 | Lei | ..................... | G06V 10/7715 |
| 2018/0217812 A1* | 8/2018 | Nakamura | .............. | G06F 16/00 |
| 2018/0294174 A1* | 10/2018 | Fujikata | ............ | H01L 21/68707 |
| 2018/0330201 A1* | 11/2018 | Witbrock | ............... | G06N 20/10 |
| 2019/0050763 A1* | 2/2019 | Panda | ...................... | G06N 3/02 |

OTHER PUBLICATIONS

Folgado, Time Alignment Measurement for Time Series (Year: 2018).*

Sakoe, H. and Chiba, S., Dynamic programming algorithm optimization for spoken word recognition, IEEE Transactions on Acoustics, Speech and Signal Processing, 26(1) pp. 43-49, 1978, ISSN: 0096-3518.

Lavielle, M. 2005. Using penalized contrasts for the change-point problem. Signal Processing, 85, 1501-1510.

Lavielle, M. 1999. Detection of multiple changes in a sequence of dependent variables. Stochastic Processes and their Applications. 83, 79-102.

Highly Comparative Feature-Based Time-Series Classification Authors: Ben D. Fulcher, Nick S. Jones, IEEE Transactions on Knowledge and Data Engineering (vol. 26, Issue: 12, Dec. 1, 2014), URL: https://ieeexplore.ieee.org/abstract/document/6786425/.

Data Based Segmentation and Summarization for Sensor Data in Semiconductor Manufacturing, Authors: Eunjeong L.Park, JooseoungPark, JiwonYang, SungzoonCho, Young-Hak, Lee, Hae-SangPark, Expert Systems with Applications, vol. 41, Issue 6, May 2014, pp. 2619-2629, URL: https://www.sciencedirect.com/science/article/pii/S0957417413009019.

* cited by examiner

3000

[   TS120_FAN_ASSEMBLY,  —— 300

TB7A4864AN_AIR_FLOW,  —— 310

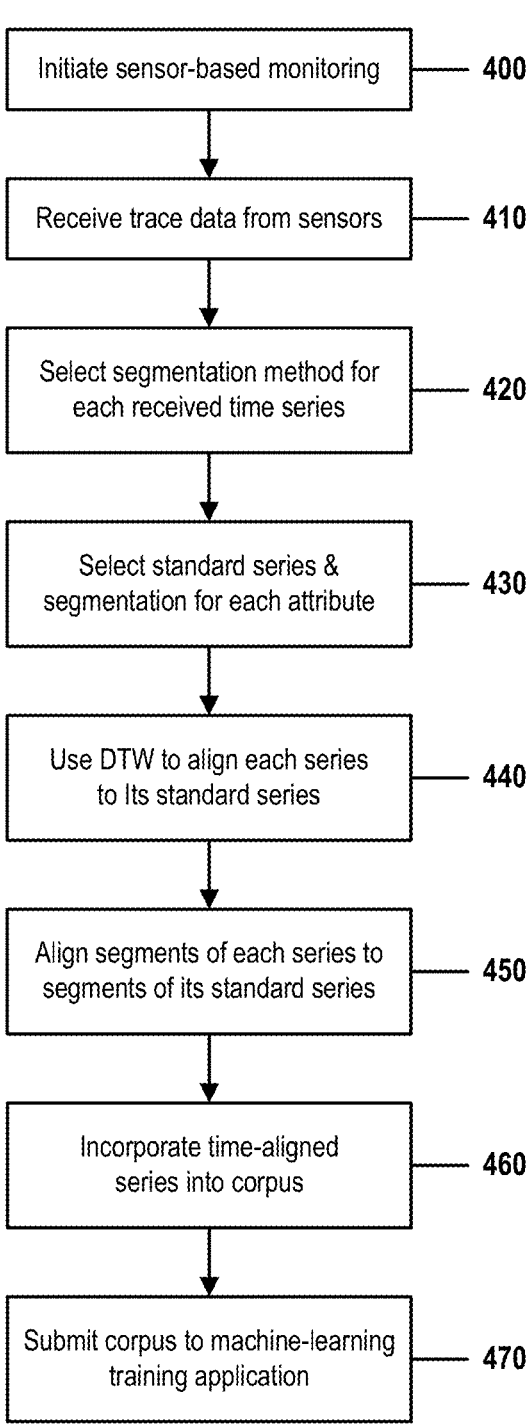

| Initiate sensor-based monitoring | — 400 |

| Receive trace data from sensors | — 410 |

| Select segmentation method for each received time series | — 420 |

| Select standard series & segmentation for each attribute | — 430 |

| Use DTW to align each series to Its standard series | — 440 |

| Align segments of each series to segments of its standard series | — 450 |

| Incorporate time-aligned series into corpus | — 460 |

| Submit corpus to machine-learning training application | — 470 |

| | | attribute 1 | attribute 2 | attribute 3 | attribute 4 | . . . | attribute M |
|---|---|---|---|---|---|---|---|
| | | 600a | 600b | 600c | 600d | 600e | 600f |
| 605a | instance 1 | 3 | 3 | 9 | 3 | | 3 |
| 605b | instance 2 | 2 | 4 | 1 | 2 | | 4 |
| 605c | instance 3 | 3 | 4 | 3 | 2 | | 3 |
| 605d | instance 4 | 4 | 4 | 3 | 2 | | 4 |
| 605e | ... | | | | | | |
| 605f | instance N | 3 | 2 | 2 | 3 | | 6 |

| | | attribute 1 | attribute 2 | attribute 3 | attribute 4 | . . . | attribute M | SUM |
|---|---|---|---|---|---|---|---|---|
| | | 610a | 610b | 610c | 610d | 610e | 610f | 610g |
| 615a | instance 1 | 1 | 1 | | 1 | | 1 | 4 |
| 615b | instance 2 | | | | | | | 0 |
| 615c | instance 3 | 1 | | 1 | | | 1 | 3 |
| 615d | instance 4 | | | 1 | | | | 2 |
| 615e | ... | | | | | | | |
| 615f | instance N | 1 | | | 1 | | | 2 |

| Standard Series | Unaligned Series | DTW Alignment (std ↔ unaligned) |
|---|---|---|
| #1 | #1 | #1 ↔ #1 |
| #2 | #2 | #1 ↔ #2 |
| #3 | #3 | #1 ↔ #3 |
| #4 | #4 | #2 ↔ #3 |
| #5 | #5 | #2 ↔ #4 |
| #6 | #6 | #2 ↔ #5 |
| #7 | #7 | #2 ↔ #6 |
| #8 | #8 | #3 ↔ #7 |
| #9 | #9 | #4 ↔ #8 |
| #10 | #10 | #5 ↔ #8 |
| #11 | #11 | #6 ↔ #9 |
| #12 | #12 | #6 ↔ #10 |
| #13 | #13 | #6 ↔ #11 |
| #14 | #14 | #7 ↔ #11 |
| #15 | #15 | #8 ↔ #11 |
| #16 | #16 | #9 ↔ #11 |
| #17 | #17 | #10 ↔ #11 |
| #18 | #18 | #11 ↔ #12 |
| #19 | #19 | #11 ↔ #13 |
| #20 | #20 | #11 ↔ #14 |
| | #21 | #11 ↔ #15 |
| | #22 | #12 ↔ #16 |
| | #23 | #12 ↔ #17 |
| | #24 | #12 ↔ #18 |
| | #25 | #12 ↔ #19 |
| | #26 | #12 ↔ #20 |
| | #27 | #12 ↔ #21 |
| | #28 | #12 ↔ #22 |
| | #29 | #12 ↔ #23 |
| | #30 | #12 ↔ #24 |
| | | #12 ↔ #25 |
| | | #13 ↔ #26 |
| | | #13 ↔ #27 |
| | | #13 ↔ #28 |
| | | #14 ↔ #29 |
| | | #15 ↔ #29 |
| | | #16 ↔ #29 |
| | | #17 ↔ #29 |
| | | #18 ↔ #29 |
| | | #19 ↔ #29 |
| | | #20 ↔ #30 |

FIG. 7

MACHINE LEARNING WITH SEGMENT-ALIGNED MULTISENSOR TRACE DATA

BACKGROUND

The present invention relates in general to machine-learning technology, and in particular to machine-learning technology that uses trace data, produced by multiple physical sensors, to train a self-learning application.

Manufacturing-process monitoring systems use sensors and other automated measuring and monitoring devices to track the efficiency, quality, and other parameters of a manufacturing operation. For example, a voltage-measuring sensor could monitor whether the output of each manufactured power-supply unit produces output within a desired range, a visual monitor could identify whether the alignment of two assembly components is within specification, or a radio-frequency sensor could measure the frequency of wireless signals produced by manufactured mobile devices.

Each sensor or monitoring device produces a time series that consists of a series of time-stamped measurements. A particular time series is associated with a corresponding attribute of an instance, where an instance is a manufacturing process or product being monitored and an attribute is a parameter that measures a characteristic of an instance.

The "trace data" output of each sensor or monitor is generally represented as a triplet or tensor that identifies a time series (a sequence of measurements arranged chronologically), the instance that is monitored by the time series, and the attribute of the instance that is measured by each entry in the time series.

For example, in a plant that manufactures a five-model line of smartphones, each of the five models would be considered an instance. If sensors monitor assembly alignment, screen brightness, antenna sensitivity, and outgoing signal strength, each of these four parameters would be considered an instance. In this example, sensors would thus produce up to twenty types of time series, each of which enumerates measurements, of one of the five smartphone models, made by one of the four types of sensors.

In this example, one trace output might consist of a triplet that specifies: i) the entry-level smartphone in the line (the instance); ii) screen brightness (the attribute); and iii) a chronologically ordered sequence of brightness measurements (the time series) that each represent the screen brightness of a manufactured unit of the low-level smartphone product that has been manufactured by the plant.

Another trace output might consist of a triplet that specifies: i) a high-end model smartphone in the line; ii) screen brightness (the attribute); and iii) a chronologically ordered sequence of brightness measurements that each represent the screen brightness of a manufactured unit of the high-end smartphone product.

Because sensors may measure different types of attributes in different ways, the time series may be difficult to compare. For example, two time series may sample an attribute at different frequencies, yielding a different number of measurements during a particular period of time. In some cases, a time series may even have a variable sampling rate, resulting in an unpredictable number of measurements during a given duration of time.

Time series may also vary in other ways. One time series may begin at a time different than the time of the first entry of a second time series, or may end at a different time than the sampling time of the final entry in the second time series. Two series may contain different numbers of samples, making it difficult to establish a one-to-one correspondence between samples of the two series.

Current technologies may attempt to address these issues by dividing a pair of time series into segments (or contiguous subsets of measurements), and then comparing each segment of the first series with a corresponding segment of the second series. Current segmentation methods, however, merely use a sliding-window method to arbitrarily divide each time series into segments that are all the same length. Because of issues like those enumerated above, this approach is useful only when the two time series are very similar.

One possible application for trace data is to facilitate the training of a software application by means of a machine-learning procedure. Such a method uses a "corpus" of logs, trace data, or other historical records to give the software examples of how certain sets of conditions have in the past correlated to future events. For example, a corpus could contain records indicating that, for a particular model of laptop, a combination of a certain screen-brightness level and a certain bus voltage has in the past been a reliable predictor of infant-mortality failures. Such a corpus could be used to train an artificially intelligent quality-assurance application to flag units of that laptop model that exhibit the certain brightness level and voltage when they emerge from the assembly line.

In order for such machine-learning to effectively train an application how to predict future events as a function of multiple, correlated conditions, a corpus much contain data streams that can be aligned in time. Furthermore, individual segments of a first data stream must each be time-aligned to a corresponding segment of a second data stream. Trace-data time series that have different or variable sampling rates, that span different periods or durations of time, that have different segment boundaries, or that differ in other nontrivial ways, cannot easily be incorporated into a corpus that is able to facilitate a binary-tree or support vector machine (SVM) machine-training procedure. Therefore, only the simplest, or most homogeneous, traces can be used to machine-train a self-learning application.

SUMMARY

An embodiment of the present invention is a machine-learning system receives from multiple sensors a set of trace-data time series. Each time series contains a chronological sequence of sensor measurements of one attribute of one instance of a manufacturing product or process. The system partitions each series into a set of contiguous segments and selects one received series to be a standard series for each attribute. The starting and ending measurements of each non-standard time series are then time-aligned to the starting and ending points of the non-standard series' corresponding standard series, using a dynamic time-warping procedure. One or more segments of each aligned non-standard series are then aligned to each segment of the corresponding standard series. The resulting time-aligned, segmented time series are then incorporated into a corpus that is used by a machine-learning module to train a self-learning application.

Another embodiment of the present invention is a method for machine learning with segment-aligned multisensor trace data. A machine-learning system receives from multiple sensors a set of trace-data time series. Each time series contains a chronological sequence of sensor measurements of one attribute of one instance of a manufacturing product or process. The system partitions each series into a set of contiguous segments and selects one received series to be a standard series for each attribute. The starting and ending measurements of each non-standard time series are then time-aligned to the starting and ending points of the non-standard series' corresponding standard series, using a dynamic time-warping procedure. One or more segments of each aligned non-standard series are then aligned to each segment of the corresponding standard series. The resulting time-aligned, segmented time series are then incorporated into a corpus that is used by a machine-learning module to train a self-learning application.

Yet another embodiment of the present invention is a computer program product including a computer-readable storage medium storing computer-readable program code that is compatible with a machine-learning system that includes a processor, a memory coupled to the processor, and a computer-readable hardware storage device coupled to the processor. The stored program code is configured to be run by the processor via the memory to perform a method for machine learning with segment-aligned multisensor trace data. The machine-learning system receives from multiple sensors a set of trace-data time series. Each time series contains a chronological sequence of sensor measurements of one attribute of one instance of a manufacturing product or process. The system partitions each series into a set of contiguous segments and selects one received series to be a standard series for each attribute. The starting and ending measurements of each non-standard time series are then time-aligned to the starting and ending points of the non-standard series' corresponding standard series, using a dynamic time-warping procedure. One or more segments of each aligned non-standard series are then aligned to each segment of the corresponding standard series. The resulting time-aligned, segmented time series are then incorporated into a corpus that is used by a machine-learning module to train a self-learning application.

BRIEF DESCRIPTION OF THE DRAWINGS

FIG. 3 shows a sample of trace data produced by a sensor.

FIG. 4 is a flow chart that illustrates the steps of a method for machine learning with segment-aligned multisensor trace data in accordance with embodiments of the present invention.

FIG. 6A shows a table comprised by an example of the method of FIG. 5 for selecting a standard time series.

FIG. 6B shows a table that continues the example of FIG. 6A.

FIG. 7 is a table that shows an example of the type of alignment that is possible with a dynamic time-warping procedure.

DETAILED DESCRIPTION

Figure 1:
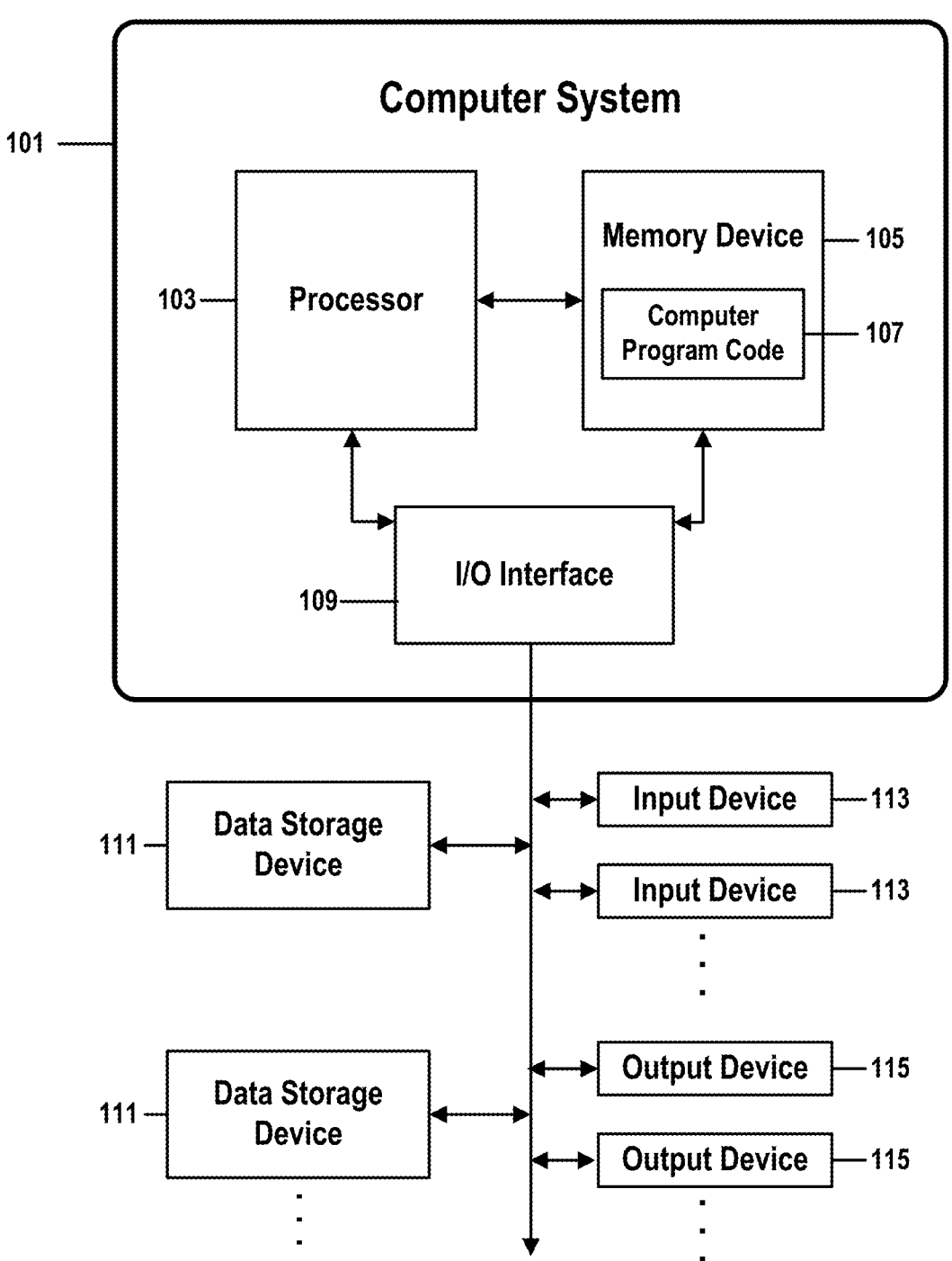
FIG. 1 shows the structure of a computer system and computer program code that may be used to implement a method for machine learning with segment-aligned multisensor trace data in accordance with embodiments of the present invention.

Embodiments of the present invention provide improved systems and methods for generating trace data that can be incorporated into a machine-learning procedure. These embodiments produce segmented, time-aligned vector input that is appropriate for a decision-tree, support vector machine (SVM), or other type of machine-learning method. Unlike known sensor-based manufacturing-monitoring systems, the present invention intelligently reconciles time series produced by sensors that cannot produce easily compared time series. Such sensors might, for example, generate time series that have incompatible sampling rates, sampling methods, start or start times, or segmentation methods.

Embodiments of the present invention implement these improvements by means of a multi-step procedure:

i) The system directs a set of sensors or other monitoring hardware or software to each sample values of a parameter ("attribute") of a manufacturing process or of units of a manufactured product (an "instance"). For example, one embodiment would direct an impedance-measuring sensor to sample the impedance (the attribute) between a +V bus and a ground bus in each manufactured unit of a powered speaker (the instance). If each unit is to be measured once, the sensor would produce a chronologically ordered sequence (the time series) of impedance values, where the values are sampled at a frequency that approximates the rate at which assembled units are manufactured.

ii) The system receives trace data from each sensor. Each set of trace data identifies an attribute, an instance, and a time series of values of the attribute for the instance.

iii) The system identifies an initial segmentation method for each series, using the method of Lavielle.

iv) The system selects, from the segmented series, a standard time series and segmentation method for each sampled attribute.

v) The system segments each series into a standard number of segments, using the standard segmentation method selected for the series' attribute. The standard number of segments for a series that measures a particular attribute is the number of segments into which that attribute's standard series is divided.

vi) The system uses dynamic time warping (DTW) to select an optimal time alignment between each series and that series' associated standard series.

vii) The system aligns each segment of each time-aligned series with a corresponding segment of that series' associated standard series.

viii) The system incorporates the segment-aligned series into a machine-learning corpus.

ix) A machine-language training module of the system submits the corpus to a self-learning application during a machine-learning training session.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a structure of a computer system and computer program code that may be used to implement a method for machine learning with segment-aligned multi-sensor trace data in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for machine learning with segment-aligned multisensor trace data in accordance with embodiments of the present invention, and may implement other embodiments described in this specification, including the methods illustrated in FIGS. 1-7. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for machine learning with segment-aligned multisensor trace data.

Any of the components of the present invention could be created, integrated, hosted, maintained, deployed, managed, serviced, supported, etc. by a service provider who offers to facilitate a method for machine learning with segment-aligned multisensor trace data. Thus the present invention discloses a process for deploying or integrating computing infrastructure, comprising integrating computer-readable code into the computer system 101, wherein the code in combination with the computer system 101 is capable of performing a method for machine learning with segment-aligned multisensor trace data.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 107 for a method for machine learning with segment-aligned multisensor trace data may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for machine learning with segment-aligned multisensor trace data is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
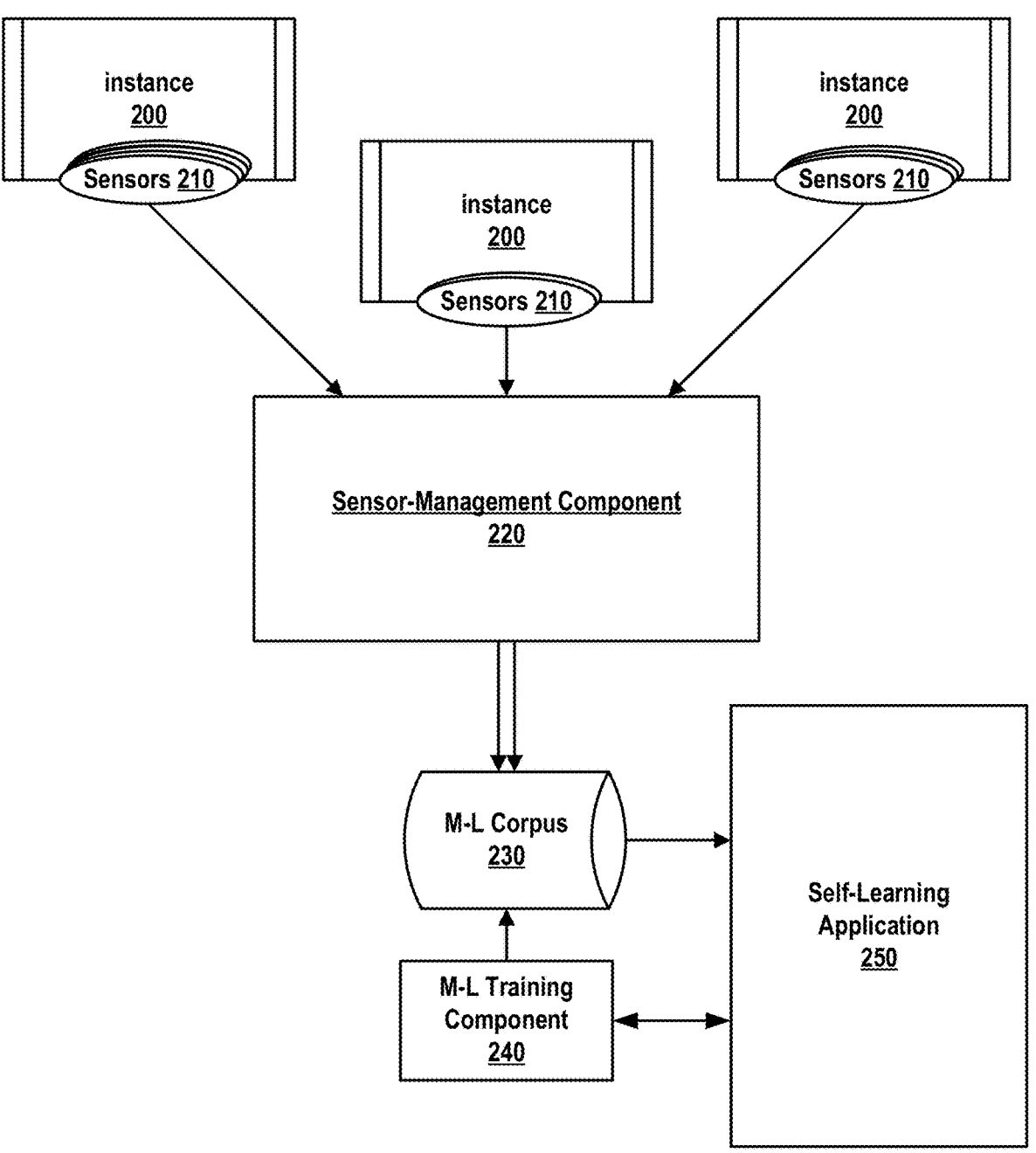
FIG. 2 shows an exemplary architecture for machine learning with segment-aligned multisensor trace data structure, in accordance with embodiments of the present invention.

FIG. 2 shows an exemplary architecture for machine learning with segment-aligned multisensor trace data structure, in accordance with embodiments of the present invention. FIG. 2 comprises objects 200-250.

Sensor-management component 220 receives trace data from sensors 210. Each sensor 210 monitors an attribute of a manufacturing instance 200, where each instance 200 is a manufacturing process (such as an assembly step, an electroplating process, or a stamping operation) or a product (such as a model of a line of consumer-electronic products, an automotive subassembly, or a bundle of washed vegetables). An attribute may be any characteristic of an instance that may be measured by a sensor or other device, such as a clearance between a rotor and a stator of an electrical motor, the strength of an infrared signal produced by a remote control, a resonant frequency of a speaker cabinet, a temperature, a tensile strength, or a weight.

Figure 3:
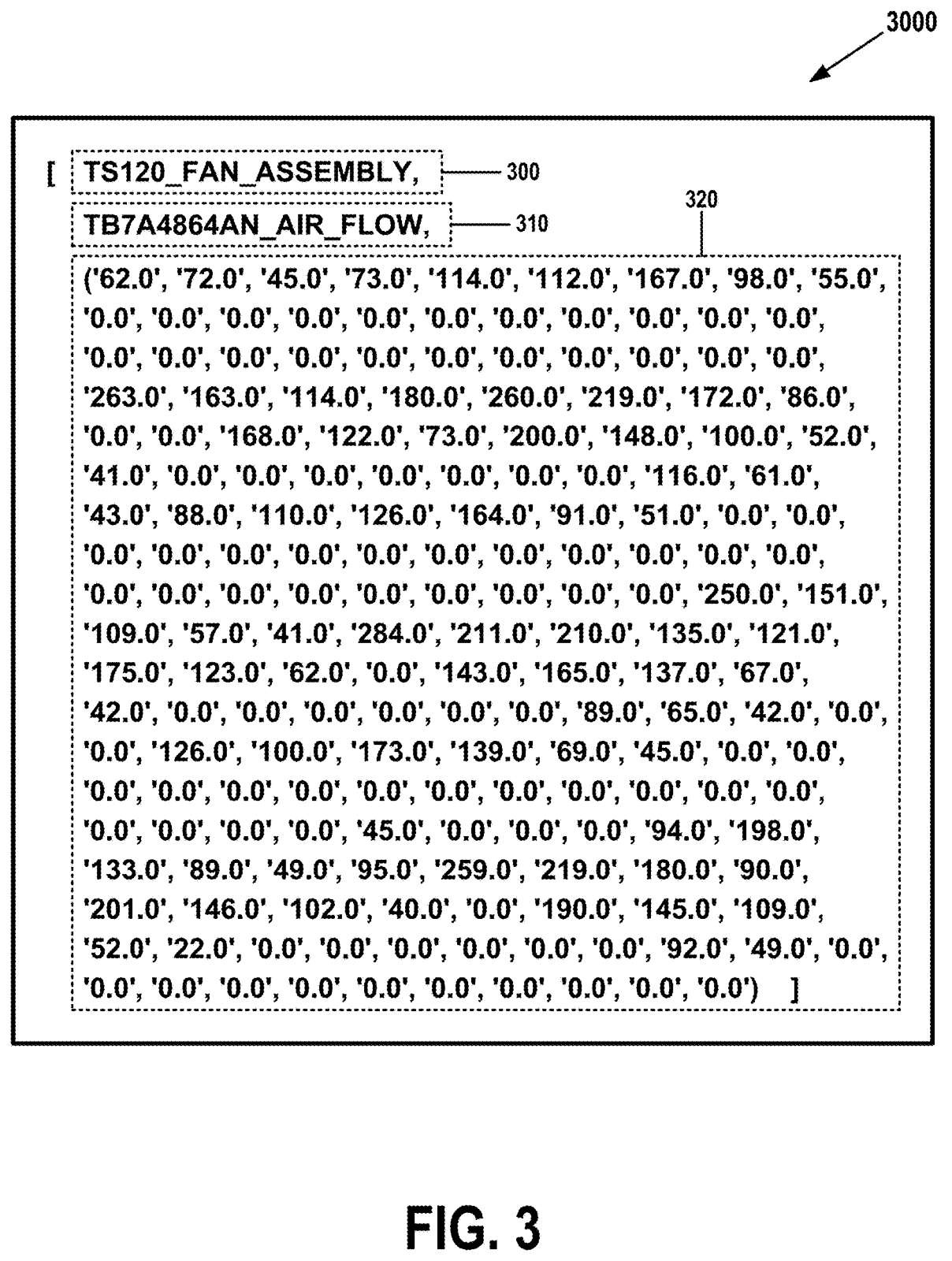

Each sensor's trace data takes the form of a triplet tensor that identifies: i) the instance being monitored; ii) the attribute being monitored; and iii) a time series that comprises a sequence of measurements of the attribute sampled over a duration of time. Each trace's time series may be structured in a manner that is distinct from that of other trace's time series. Traces may differ in sampling rates, starting and ending times, overall durations, and in other ways that make them difficult or impossible to correlate. FIG. 3 shows an example of a trace produced by a sensor 210.

Sensor-management component 220 transforms the received traces from their raw tensor forms into homogeneous data streams that are segmented and time-aligned in a consistent manner. Unlike the original tensor data, these time-aligned data streams represent the time-series data culled from sensors 210 in a manner that allows the inference and correlation of various conditions and states of each attribute at different times. The ability to infer such correlations from these aligned time series makes they appropriate for use as training data in a machine-learning operation.

Sensor-management component 220 stores these segmented, aligned series in a corpus 230, which a machine-learning training component 240 later submits to a self-learning application 250 during a machine-learning training session. Self-learning application 250 gains experience during such training sessions that allows the application 250 to better infer semantic meaning from certain types of attribute behavior and to use these inferred meanings to predict future events.

In one example, component 220 submits time-series to corpus 230 from which may be inferred a correlation between a failure of a mechanical assembly unit's functional quality-assurance test and a certain combination of attributes of the unit measured by sensors 210 (such as a clearance greater than 0.005 inches between two components of the unit and a thickness of either component that exceeds a 0.01% tolerance). A machine-learning training session based on this corpus 230 could then teach application 250 to predict a likely QA failure when application 250 identifies a unit for which those two conditions exist.

FIG. 3 shows a sample of trace data 3000 produced by a sensor 210. FIG. 3 shows steps 300-320 and 3000.

In this example, trace data 3000 is represented as a 3-tuple or three-dimensional tensor that consists of elements 300, 310, and 320. As is known in the art, other representations, structures, or formats are possible, but in all cases, trace data will contain information that is at least analogous to the content of items 300-320.

Item 300 is the first data element of triplet 3000 and identifies the "instance" being monitored by the sensor 210. In this example, the instance is a fan assembly with model number TS120, identified by the string "TS120_FAN_ASSEMBLY." An instance may be any product, process, or other entity that an implementer wishes to monitor. Embodiments of the present invention are flexible enough to accommodate any instance-identification format or convention desired by an implementer.

Item 310 is the second data element of triplet 3000 and identifies the "attribute" of instance 3100 that is being monitored by the sensor 210. An attribute may be any characteristic of the instance that an implementer wishes to monitor. Examples of characteristics include: a dimension, a clearance between components of an assembly, an accuracy of an alignment of multiple parts, a signal strength or frequency, a tensile strength, an elasticity, a color, a level of a contaminant, a frequency response of an audio component, and a sensitivity of an antenna.

In this example, the attribute identified by element 310 is the air flow produced by manufactured units of the fan assembly during functional testing. This attribute is identified in the example of FIG. 3 by the string "TB7A4864AN_AIR_FLOW," which may be interpreted as identifying the trace data as being a compilation of air flow measurements recorded by sensor TB7A4864AN. Embodiments of the present invention are flexible enough to accommodate any attribute-identification format or convention desired by an implementer.

Item 320, the third data element of triplet 3000, is a time series of measurement values. Each value is produced by the sensor 210 and represents a measurement of the attribute associated with a unit of the instance.

In the example of FIG. 3, time series 320 is a list of measured values of air flow produced by manufactured units of the TS120 fan assembly. These measurements may be ordered in ascending or descending chronological order, but regardless of how the time series is ordered, the measurements must be ordered in a known, deterministic manner from which embodiments of the present invention are able to determine the sample time of each measurement.

One possible interpretation of the first four data elements of time series 320, assuming a sample rate of 2 samples/minute, units of cubic feet/minute (CFM), and a start time of 21:00:00 would be: 62.0 CFM at 21:00:00, 72.0 CFM at 21:00:30, 45.0 CFM at 21:01:00, and 73.0 CFM at 21:01:30. In this example, these measurements would each correspond to a different manufactured TS120 fan-assembly unit, where each measurement was collected during a functional test performed on TS120 assemblies as each assembled unit leaves an assembly line. In certain implementations, multiple sensors 210 may measure more than one attribute of the same unit concurrently, simultaneously, or sequentially at different stages of the manufacturing or testing workflow.

The sample rate or frequency of the time-series measurements, and the sample time of the first or last measurement, may be specified by another data element of trace 3000, or it may be determined by other means, such as by a lookup into a configuration file or determined as a function of a specification of the sensor 210 or characteristic of the instance or attribute.

In some cases, each time-series measurement may be represented as an ordered pair of values that respectively specify the time at which a measurement was sampled and the value of that measurement. In some cases, each time-series measurement may include an element that identifies units of the measurement. This may be deemed useful in cases where sensors do not all produce measurements in the same unit or produce such a wide range of measurement values that representing all measurements with the same units would waste storage space. For example, in some applications, rather than allocating ten significant digits to a voltage measurement that can range from 1 microvolt to 1 kilovolt, each measurement could be represented more efficiently as three significant digits and a single-digit exponent. Similarly, if a first airflow/air velocity sensor 210 produces measurements in units of liters/minute and a second airflow/air velocity sensor 210 produces measurements in units of miles/hour, an embodiment may facilitate downstream comparisons by incorporating a mechanism for associating each sensor 210, or each time series 320 produced by either sensor 210, with a specific unit.

FIG. 4 is a flow chart that illustrates the steps of a method for machine learning with segment-aligned multisensor trace data in accordance with embodiments of the present invention. FIG. 4 shows steps 400-480, which may be performed by embodiments based on architectures similar to those of FIGS. 1-2.

In step 400, a set of sensors 210 begins measuring attributes of instances in a manufacturing, service, or other type of production environment. Each sensor 210 measures one attribute of one instance and produces a sequential time series that consists of measurements of that instance's attribute over a period of time.

In step 410 the sensor-management component 220 receives trace data 3000 from each sensor 210. As shown in FIG. 3, each trace may take the form of a 3-tuple or tensor 3000 that identifies an instance and an attribute of the instance being monitored and comprises a time series 320 of measurements of the instance. Other data elements may be included in each trace if desired by an implementer or required for technical reasons.

The received time series 320 may not be in formats that allow them to be easily compared, or to be transformed into vector formats capable of being used as input to a machine-learning system based on a common machine-learning method like SVM or decision-tree logic. Time series can, for example, contain different numbers of samples or samples of different lengths, may span different durations of time, or may have been collected with different sample rates or with a variable sample rate.

In step 420, sensor-management component 220 selects a segmentation method for each received trace. Segmentation divides a time series into contiguous subsets (or "segments") of measurements and the choice of segmentation method determines which samples are included in each segment.

When aligning two time series, the choice of segmentation method can be crucial in determining which segments of the first time series should align with each segment of the second series. Current segmentation methods, however, merely use a sliding-window method to divide each time series into a sequence of fixed-size segments. This arbitrary segmentation method does not account for the types of differences between time series described above, and even when the size of a sliding window or the total number of segments is chosen by a human expert, at least some time series are segmented in ways that do not bear some logical relationship to the content of the series.

For example, it might make sense to segment a time series of voltage measurements into contiguous sequences of measurements that each represent a particular voltage state. In such a case, a series {0.0, 0.0, 0.0, 1.1, 1.1, 1.2, 1.1, 1.1, 0.0, 0.0} would be divided into three segments: {0.0, 0.0, 0.0}, {1.1, 1.1, 1.2, 1.1, 1.1}, and {0.0, 0.0}.

Similarly, an implementer might want to segment a time series of frequency measurements into contiguous sequences of measurements that each represent a particular frequency signal. Here, a series {350, 350, 350, 60, 57, 60, 60, 55, 4200, 4150, 350, 350, 350} would be divided into four segments: {350, 350, 350}, {60, 57, 60, 60, 55}, {4200, 4150} and {350, 350, 350}.

In yet another example, it can make sense in certain applications to segment a time series based on whether contiguous values in the series are rising or falling, or as a function of the speed at which values are rising or falling. In the first case, a series {20, 22, 24, 25, 23, 15, 8, 3, 20, 40, 60, 61, 62, 60, 58} might be segmented into the four segments {20, 22, 24, 25}, {23, 15, 8, 3}, {20, 40, 60, 61, 62}, and {60, 58} and in the second case, the series might be segmented into the three segments {20, 22, 24, 25, 23}, {15, 8, 3, 20, 40, 60}, and {61, 62, 60, 58}.

Many other types of segmentation methods may be useful in various implementations, including methods based on combinations of parameters similar to those listed above, and each method may specify dividing a series into a different number of segment. Known methods of segmenting time series that simply divide a series into arbitrary fixed-size segments or into a an arbitrarily fixed number of segments cannot intelligently segment measurement data in a manner from which a cognitive machine-learning program may infer semantic meaning that underlies the raw measurement data.

Embodiments of the present invention address this issue through a multi-step procedure that begins with the initial segmentation selection of step 420. In this step, sensor-management component 220 uses the known method of Lavielle to select a segmentation method. Although a detailed description of the method of Lavielle is beyond the scope of this document, Lavielle can be generally characterized as procedure for finding the best segmentation for a series by selecting a segmentation method for which a standardized "contrast function" is minimized. This may be performed through an iterative process that determines the best number of segments L into which a series may be partitioned by choosing a smallest value of L for which the second derivative of the contrast function is greater than a threshold S.

Furthermore, if a time series TS(ij) consists of measurements of attribute j for instance i, the segmentation method for series TS(ij) will divide TS(ij) into total number of L(ij) segments. It is possible that every series TS(ij) will be associated with a different value of L(ij).

Embodiments of the present invention are flexible enough to also support substitution of alternate methods known in the art for choosing a segmentation method for a series of values, such as the method of Gueguen.

At the conclusion of step 420, each received time series will have been segmented by means of a method that is selected especially for that series. Although time series generated for the same attribute, or by a same type of sensor 210, may be very similar in format, it is possible that such similar series may at this point have been segmented in very different manners. Each series will thus have been divided into contiguous subsets of samples, where the number of subsets in a particular series does not necessarily match the number of subsets into which other series have been segmented, and the number of samples in each subset of a series does not necessarily match the number of samples in subsets of other series. Furthermore, each subset of a single series may contain a different number of samples.

In step 430, the component 220 selects, for each monitored attribute, one of the received time series to be a "standard" series for a corresponding attribute. The segmentation method chosen in step 420 for a standard series of an attribute j is then deemed to be a "standard" segmentation method for all series associated with that attribute and the number of segments into which the standard method divides the standard series is deemed to be a "standard" number of segments L(jOPT) for that attribute.

Figure 5:
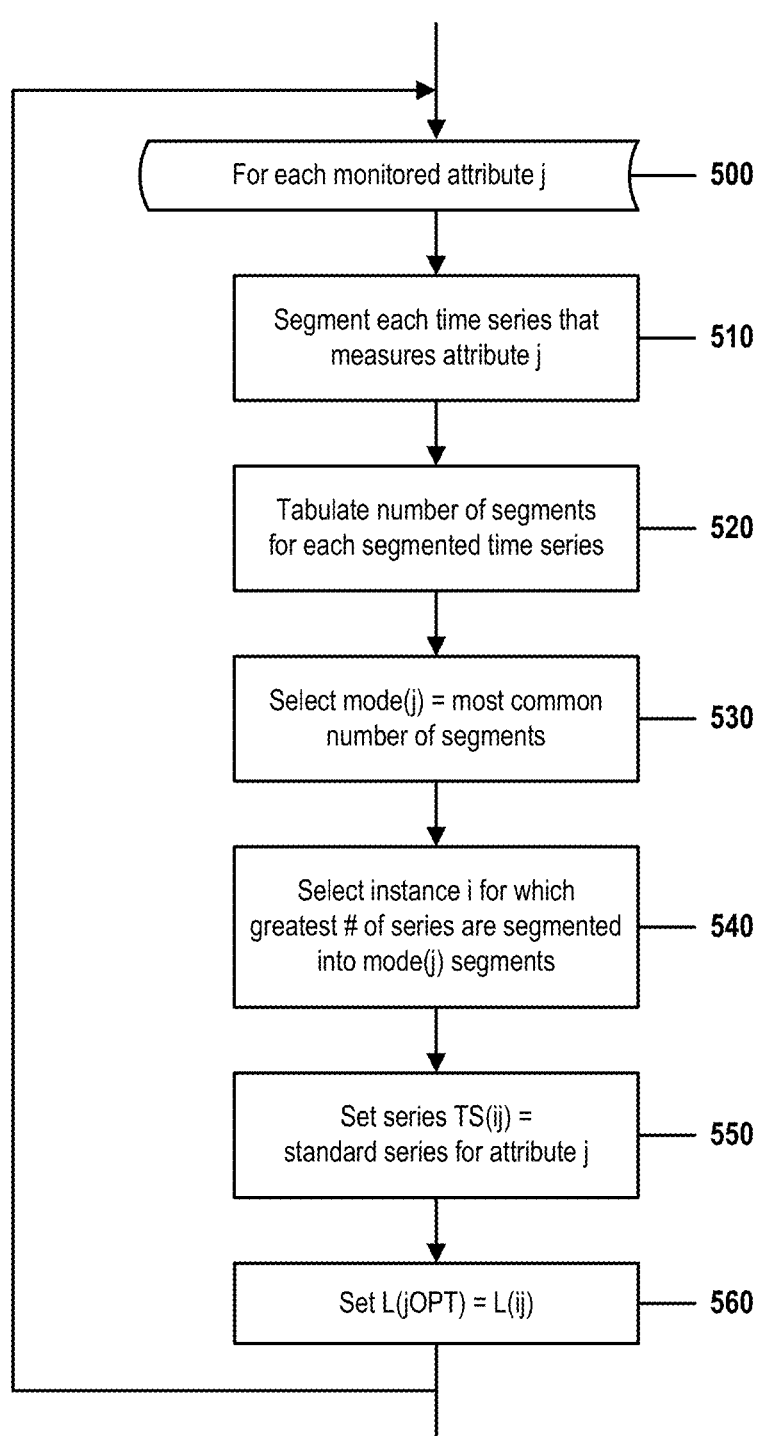
FIG. 5 is a flow chart that illustrates steps of a method for selecting a standard time series for each attribute.

This method of standards-selection is described in greater detail in FIGS. 5-7.

At the conclusion of step 430, component 220 will have selected, from the received time series, a standard time series for each monitored attribute j, and will have selected a standard segmentation method to be applied to all time series that measure attribute j. Accordingly, every standard time series TS(ij) (for instance i and attribute j) will be divided by the standard segmentation method for attribute j into a standard number of segments L(ij)=L(jOPT).

In step 440, component 220 uses known methods of dynamic time warping (DTW) to align each time series that measures a particular attribute to the standard time series for that particular attribute. Although beyond the scope of this document to describe in detail, DTW time-aligns a pair of series by aligning the two series' starting points and by aligning the two series ending points. The other points of that one series are then aligned in many-to-many relationships with points of the second series. That is, each point of the first time series may be associated with more than one point of the second series and each point of the second series may be associated with more than one point of the first series.

FIG. 7 is a table 7000 that illustrates an example of the type of alignment that is performed by a dynamic time-warping procedure. FIG. 7 shows items 700-710 and 7000.

In this example, each row of column 700 lists a point of a 20-point standard time series for attribute j. Each row of column 705 lists a point of an unaligned ("target") 30-point time series for attribute j that is to be aligned to the standard series. Performing a DTW procedure on these two series aligns the 30 points of the unaligned target time series to the 20 points of the standard series.

These alignments do not necessarily comprise one-to-one relationships between each point of the standard series and each point of the target series. That is, one point of the standard series may be aligned to multiple points of the target series, and one point of the target series may be aligned to multiple points of the standard series. The goal of the DTW procedure, as is known in the art, is to select alignments that minimize a "contrast" function. A single point of one series may thus be aligned to more than one point of the other series if each of those alignments produces a minimized value of the contrast function.

The resulting alignments of this example are shown in column 710. The first row of column 710 shows that the starting point #1 of the standard series, as is always the case in a DTW procedure, has been aligned with the starting point #1 of the target series. The last row of column 710 shows that the ending point (#20) of the standard series, as is always the case in a DTW procedure, has been aligned by with the ending point (#30) of the target series.

The first three rows of column 710 show that the starting point #1 of the standard series has further been aligned by the DTW procedure with points #1, #2, and #2 of the previously unaligned target series. The third and fourth row of column 710 show that the point #3 of the target series has further been aligned by the DTW procedure with points #1 and #2 of the standard series.

In this example, at the conclusion of step 440, component 220 will have identified an alignment between the target series for attribute j and the standard series for attribute, such that alignment comprises the list of point-to-point alignments listed in column 710.

In the more general case, at the conclusion of step 440, component 220 will have identified a similar alignment for every non-standard received time series, where, for every attribute j, the points of each non-standard series will be aligned by a DTW procedure to the points of the standard time series for attribute j.

Returning to step 450 of FIG. 4, system 220, for each attribute j, aligns the segments of each non-standard time series for attribute j with the segments of the standard series for attribute j. Component 220 performs this operation by means of the alignments produced by the DTW procedures of step 440.

This step is performed for a target series associated with attributed j by selecting, for each segment of the standard series for an attribute j, the segment of the target series that contains the greatest number of points aligned, by the DTW procedure, to points within the segment of the standard series.

For example, extending the example of FIG. 7, the 20-point standard series is divided into three segments:
  SSeg1 (points 1-5),
  SSeg2 (points 6-11), and
  SSeg3 (points 12-20);
and the 30-point target series has been divided into four segments:
  GSeg1 (points 1-7),
  GSeg2 (points 8-20),
  GSeg3 (points 21-28), and
  GSeg4 (points 29-30).
points 1-5. In step 450, component 220 would align one segment of the target series to each of the three segments of the standard series. For example, component 220 would align to SSeg1 a segment of the target series that contains the greatest number of points that align to SSeg1's points 1-5.

Column 710 of FIG. 7 shows that all seven points of GSeg1 have been aligned by the DTW procedure to points of standard-series segment SSeg1. Similarly, column 710 of FIG. 7 shows that only point #8 of GSeg2 aligns to a point of standard series segment SSeg1. No points of GSeg3 or GSeg4 align to any point of SSeg1.

Because a greater number of GSeg1 points align to SSeg1 points than do points of any other target-series segment, processor 220 in this step aligns segment GSeg1 of the target series to segment SSeg1 of the standard series.

This procedure is repeated for every segment of the standard series until one or more segments of the target series for attribute j have been aligned to every segment of the standard series for attribute j. This entire procedure is then repeated for each remaining attribute.

In some embodiments, it is possible that more than one segment of the target series may comprise the same maximum number of points that align to the same segment of the standard series. For example, if the greatest number of target-segment points that align to the third segment of a standard series is twelve, it is possible that the second target-series segment and the third target-series segment may both comprise twelve aligning points.

When encountering such a condition, an embodiment may incorporate any type of resolution desired by an implementer. For example, an embodiment might simply choose one of the target-series segments at random and discard the others, might attempt to eliminate the duplicate number of alignment points by performing another dynamic time-warping procedure using different parameters, or might select one of the target-series segments as a function of a predefined condition or of a characteristic of the target-series' attribute or instance.

At the conclusion of step 450, the component 220 will have, for every attribute j, aligned every segment of every non-standard attribute-j time series to a corresponding segment of the standard time series for attribute j. All time series for a particular attribute will have then been aligned in a manner that allows direct comparison of the time series for that attribute, and that allows second-order structured features to be derived and compared of each series. Such structured features describe characteristics of the data comprised by each time series, such as max/min values, variances, standard deviations, skewness, and other structured features—.

In step 460, component 220 formats the aligned time series into a corpus suitable for training self-learning application 250 by means of a machine-learning operation. In some embodiments, component 220 may merely forward the aligned time series to the machine-learning training component 240, which incorporates the forwarded series into a corpus through known methods of machine-learning.

In step 470, if it has not already forwarded the aligned time series to the machine-learning training component 240, component 220 submits the corpus to the machine-learning training component 240. In either case, the training component 240 will use the aligned time series comprised by the corpus to train the self-learning application 250 by means of known methods of machine learning.

In some embodiments, component 220 will also forward any generated structured features to the training component 240. Training component 240 will then either incorporate the structured features into the corpus or use the structured features to manage a machine-learning training session that comprises the corpus.

FIG. 5 is a flow chart that illustrates steps of a method for selecting a standard time series for each attribute. This method describes step 430 of FIG. 4 in greater detail. FIG. 5 shows steps 500-560, which may be performed by embodiments based on architectures similar to those of FIGS. 1-2.

Step 500 initiates an iterative procedure of steps 500-560, which is repeated by sensor-management component 220 once for each monitored attribute j.

In step 510 component 220 segments each time series that contains measurements of attribute j into a set of contiguous subsets, or "segments." Each series is segmented by means of a segmentation method chosen for that particular series by the method of Lavielle in step 420 of FIG. 4.

In step 520, component 220 tabulates the number of segments comprised by each time series segment in step 510.

In step 530, component 220 sets mode(j) equal to the number of segments that occurs most frequently in the tabulation of step 520. For example, if six time series have been divided into, respectively, 6, 5, 4, 4, 5, and 5 segments, mode(j) would be set to 5 because more series consist of five segments than to any other number of segments.

In step 540, component 220 tabulates the total number of time series—regardless of which attribute those series measure—that were segmented into mode(j) segments by segmentation methods selected in step 420. The system then counts how many of these time series are associated with each instance. The system then identifies an instance i that is: i) associated with the greatest number of time series that have been segmented into mode(j) segments; and ii) is associated with at least one time series that is associated with attribute j.

In step 550, component 220 selects time series TS(ij) as the standard time series for attribute j. Series TS(ij) is the time series that is associated with instance i and attribute j.

In optional step 560, component 220 sets L(jOPT) equal to the number of segments L(ij) into which standard time series TS(ij) was segmented in step 420.

This procedure is illustrated by the examples of FIGS. 6A-6B.

FIG. 6A shows a table comprised by an example of the method of FIG. 5 for selecting a standard time series. FIG. 6A shows items 600a-605f and 6000.

In this example, each time series TS(ij) received in step 410 of FIG. 4 comprises measurements of an attribute j, $j \subset \{1, \ldots, M\}$, for an instance i, $i \subset \{1, \ldots, N\}$. Each time series TS(ij) is associated with a segmentation method, selected by the method of Laveille in step 420, that segments TS(ij) into L(ij) segments.

Each column 600a-600f of table 6000 shows data characterizing each time series associated with one particular attribute. For example, entries in column 600a show data characterizing time series associated with attribute 1 and entries in column 600b show data characterizing time series associated with attribute 2.

Each row 605a-605f of table 6000 shows data characterizing each time series associated with one particular instance. For example, entries in row 605a show data characterizing time series associated with instance 1 and entries in row 605b show data characterizing time series associated with instance 2.

Each cell of table 6000 contains data that lists the number of segments into which a corresponding time series has been segmented by the method of Laveille. For example, the cell of table 6000 at the intersection of column 600a and row 605b shows that series TS(2,1), which comprises measurements of attribute 1 of instance 2, had been segmented into three segments.

As described in step 530, a mode(j) value identifies, for an attribute j, the number of segments into which time series of attribute j are most often segmented. In the example of FIG. 6A, considering only the series shown in table 6000, mode (1)=3 because column 600a shows that more time series of attribute 1 have been divided into three segments than have been divided into any other number of segments. Similarly, table 6000 shows that mode(2)=4 because column 600b shows that more time series of attribute 2 have been divided into four segments than have been divided into any other number of segments.

FIG. 6B shows a table that continues the example of FIG. 6A. FIG. 6B shows items 610a-615f and 6100.

Like table 6000, each cell of table 6100 shows data characterizing one time series TS(ij), where each column 610a-610f shows data for one attribute j and each row 615a-615f shows data for one instance i. Table 6100 also adds a SUM column 610g, described below.

A table similar to table 6100 is generated for each attribute j. Each cell of a table 6100 for an attribute j contains a binary TRUE/FALSE value to identifies whether the corresponding time series TS(ij) has been segmented into mode(j) segments.

For example, in the example of FIG. 6A mode(1) of attribute 1 was set to a value of 3. Each cell of a table 6100 for attribute 1 would therefore contain a binary TRUE value only if the cell's corresponding time series had been segmented into three segments. As can be seen in table 6000, four time series of instance 1 (TS(1,1), TS(1,2), TS(1,4) and TS(1,M)) have been segmented into three segments. The SUM entry for instance 1, shown in column 610g, is thus equal to four.

This same enumeration and sum is performed for the time series of each other instance. For example, the sums enumerated in column 610g show that no time series of instance 2 and three time series of instance 3 have been segmented into three segments.

The component 220 next selects the instance that has the greatest SUM value in column 610g. In the current example, this selected instance is the instance associated with the greatest number of time series segmented into mode(1) segments. Because mode(1)=3, and because rows 605a and 615a each show that a SUM of four time series for instance 1 have been segmented into three segments—a greater sum than for any other instance—instance 1 is selected as the instance to be associated with the standard time series for attribute 1. Time series TS(1,1) is thus the standard time series for attribute 1.

This procedure is repeated for each attribute, with a distinct table 6100 generated for each attribute, where the sums of a table 6100 generated for an attribute j are derived as a function of the previously derived mode(j). At the conclusion of this procedure, a standard time series TS(ij) will have been selected for every attribute j.

In some embodiments, it is possible that an instance associated with the greatest SUM value for an attribute j will itself not be segmented into mode(j) segments. This would have occurred, for example, if, in FIG. 6A, every time series of instance 1 except time series TS(1,1) had been segmented into three segments. Here, mode(1) would still be equal to 3 and instance 1 would be associated with the greatest SUM value, but the time series for attribute 1 of instance 1 would not itself have been segmented into the standard number of segments mode(1).

Embodiments of the present invention are flexible enough to handle this condition in any manner desired by an implementer. For example, a condition may be imposed that such instances are excluded from consideration as a standard time series. In other words, the only time series of attribute j that may be selected as a standard time series for attribute j are those that have been segmented into mode(j) segments.

In other cases, the system may instead select an instance i associated with the greatest SUM value, even if time series TS(ij) is not segmented into mode(j) segments, and then apply the standard segmentation method to TS(ij) in order to force TS(ij) to be segmented into mode(j) segments.

Other resolutions to such exceptional cases may be incorporated into an embodiment, if desired by an implementer.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A machine-learning system comprising a processor, a memory coupled to the processor, and a computer-readable hardware storage device coupled to the processor, the storage device containing program code configured to be run by the processor via the memory to implement a method for machine learning with segment-aligned multisensor trace data, the method comprising:

the machine-learning system receiving, from a set of sensors, a set of time series that each comprises a chronological sequence of measurements of an attribute, of a set of attributes of a mechanical assembly unit, of an instance, of a set of instances of measured entities;

the machine-learning system selecting for each received time series a corresponding initial segmentation method of a set of segmentation methods, where a first selected initial segmentation method partitions measurements comprised by a corresponding first time series of the received time series into a first sequence of at least two contiguous target segments, and where the first selected initial segmentation method determines a number of segments in the first sequence and a number of measurements comprised by each segment of the first sequence;

the machine-learning system designating one series of the received time series to be a first standard series for a first attribute of the set of attributes, where the first standard series comprises measurements of the first attribute;

the machine-learning system time-shifting measurements of each target series of the set of received time series, such that each time-shifted measurement is time-aligned with a corresponding measurement of the first standard series, where measurement of each target series is a measurement of the first attribute, where the time-shifting aligns each target series to the first standard series by performing a method of dynamic time warping (DTW), and where the machine-learning system determines that a first target segment of the first target series, of the set of received time series, should be segment-aligned to a first standard segment of the first standard series by determining that a number of measurement points of the first target segment that have been aligned by the DTW procedure to any measurement point of the first standard segment is at least as large as a number of measurement points of any other segment of the first target series that have been aligned by the DTW procedure to any measurement point of the first standard segment;

the machine-learning system modifying a corpus configured to train a self-learning application by incorporating each segment-aligned series into the corpus, said corpus being a data storage device, wherein the segment aligned series enables an effective training of the self-learning application; Pars. 12-13;

the machine-learning system training the self-learning application by submitting the modified corpus to the self-learning application, wherein said training the self-learning application comprises: (i) using training data to perform the training, said training data comprising each time-shifted measurement that is time-aligned with the corresponding measurement of the first standard series, (ii) teaching the self-learning application to make a prediction of a likely failure of the mechanical assembly unit's fictional quality-assurance test, wherein said making the prediction is in response to the self-learning application identifying adverse conditions, as measured by the set of sensors, on the set of attributes of the mechanical assembly unit as the mechanical assembly unit leaves an assembly line of a manufacturing process that manufactured the mechanical assembly unit, and (iii) gaining experience, by the self-learning application, that allows the self-learning application to infer a semantic meaning from behavior of the set of attributes of the mechanical assembly unit as the mechanical assembly unit leaves the assembly line and to use the inferred semantic meaning to predict the likely failure of the mechanical assembly unit's functional quality-assurance test; and executing the trained self-learning application using the inferred semantic meaning to predict the likely failure of the mechanical assembly unit's functional quality-assurance test, wherein the machine-learning system uses a method of Lavielle to select an initial segmentation method for each received time series, wherein the selection of each initial segmentation method comprises: using the method of Lavielle to assign a contrast-function value to each received time series, and determining an optimal number of segments L into which a particular received time series should be segmented by choosing a smallest value of L for which a second derivative of the particular received time series' contrast function is greater than a threshold S.

2. The system of claim 1, where the aligning a first target series to the first standard series further comprises:

time-aligning a chronologically earliest measurement of the first target series to a chronologically earliest measurement of the first standard series, and time-aligning a chronologically last measurement of the first target series to a chronologically last measurement of the first standard series.

3. The system of claim 1, where the designating the one series to be a first standard series for a first attribute further comprises:

the processor selecting a subset of the received time series, where each time series of the subset comprises a chronological sequence of measurements of the first attribute;

the processor tabulating a number of segments into which each time series of the subset is divided by a corresponding initial segmentation method selected for that time series;

the processor identifying a mode of the first attribute, where the mode of the first attribute is a member of segments most often identified by the tabulated numbers of segments;

the processor associating each instance of the set of instances with a corresponding group of time series, where each series of a group corresponding to a first instance of the set of instances: i) comprises measurements of an attribute, of the set of attributes, of the first instance, and ii) is segmented by a corresponding initial segmentation method into the number of segments identified by the mode of the first attribute;

the processor identifying a standard instance of the first attribute to be an instance, of the set of instances, that is associated with a corresponding group that comprises a largest number of time series; and the processor choosing the first standard series to be a time series of the received time series that comprises measurements of the first attribute of the standard instance.

4. The system of claim 1, where each measured entity is selected from the group consisting of a physical object and a manufacturing process.

5. A method for machine learning with segment-aligned multisensor trace data, the method comprising:

a machine-learning system receiving, from a set of sensors, a set of time series from a set of sensors that each comprises a chronological sequence of measurements of an attribute, of a set of attributes of a mechanical assembly unit, of an instance, of a set of instances of measured entities;

the machine-learning system selecting for each received time series a corresponding initial segmentation method of a set of segmentation methods, where a first selected initial segmentation method partitions measurements comprised by a corresponding first time series of the received time series into a first sequence of at least two contiguous target segments, and where the first selected initial segmentation method determines a number of segments in the first sequence and a number of measurements comprised by each segment of the first sequence;

the machine-learning system designating one series of the received time series to be a first standard series for a first attribute of the set of attributes, where the first standard series comprises measurements of the first attribute;

the machine-learning system time-shifting measurements of each target series of the set of received time series, such that each time-shifted measurement is time-aligned with a corresponding measurement of the first standard series, where measurement of each target series is a measurement of the first attribute, where the time-shifting aligns each target series to the first standard series by performing a method of dynamic time warping (DTW), and where the machine-learning system determines that a first target segment of the first target series, of the set of received time series, should be segment-aligned to a first standard segment of the first standard series by determining that a number of measurement points of the first target segment that have been aligned by the DTW procedure to any measurement point of the first standard segment is at least as large as a number of measurement points of any other segment of the first target series that have been aligned by the DTW procedure to any measurement point of the first standard segment;

the machine-learning system modifying a corpus configured to train a self-learning application by incorporating each segment-aligned series into the corpus, said corpus being a data storage device;

the machine-learning system training the self-learning application by submitting the modified corpus to the self-learning application, wherein said training the self-learning application comprises: (i) using training data to perform the training, said training data comprising each time-shifted measurement that is time-aligned with the corresponding measurement of the first standard series, (ii) teaching the self-learning application to make a prediction of a likely failure of the mechanical assembly unit's functional quality-assurance test, wherein said making the prediction is in response to the self-learning application identifying adverse conditions, as measured by the set of sensors, on the set of attributes of the mechanical assembly unit as the mechanical assembly unit leaves an assembly line of a manufacturing process that manufactured the mechanical assembly unit, and (iii) gaining experience, by the self-learning application, that allows the self-learning application to infer a semantic meaning from behavior of the set of attributes of the mechanical assembly unit as the mechanical assembly unit leaves the assembly line and to use the inferred semantic meaning to predict the likely failure of the mechanical assembly unit's functional quality-assurance test; and executing the trained self-learning application using the inferred semantic meaning to predict the likely failure of the mechanical assembly unit's functional quality-assurance test, wherein the machine-learning system uses a method of Lavielle to select an initial segmentation method for each received time series, wherein the selection of each initial segmentation method comprises: using the method of Lavielle to assign a contrast-function value to each received time series, and determining an optimal number of segments L into which a particular received time series should be segmented by choosing a smallest value of L for which a second derivative of the particular received time series' contrast function is greater than a threshold S.

6. The method of claim 5, where the time-shifting the first target series to the first standard series further comprises:

the machine-learning system using a method of dynamic time warping (DTW) to time-align a chronologically earliest measurement of the first target series to a chronologically earliest measurement of the first standard series, and the machine-learning system using a method of dynamic time warping (DTW) to time-align a chronologically last measurement of the first target series to a chronologically last measurement of the first standard series.

7. The method of claim 5, where the designating the one series to be a first standard series for a first attribute further comprises:

the processor selecting a subset of the received time series, where each time series of the subset comprises a chronological sequence of measurements of the first attribute;

the processor tabulating a number of segments into which each time series of the subset is divided by a corresponding initial segmentation method selected for that time series;

the processor identifying a mode of the first attribute, where the mode of the first attribute is a number of segments most often identified by the tabulated numbers of segments;

the processor associating each instance of the set of instances with a corresponding group of time series, where each series of a group corresponding to a first instance of the set of instances: i) comprises measurements of an attribute, of the set of attributes, of the first instance, and ii) is segmented by a corresponding initial segmentation method into the number of segments identified by the mode of the first attribute;

the processor identifying a standard instance of the first attribute to be an instance, of the set of instances, that is associated with a corresponding group that comprises a largest number of time series; and the processor choosing the first standard series to be a time series of the received time series that comprises measurements of the first attribute of the standard instance.

8. The method of claim 5, further comprising providing at least one support service for at least one of creating, integrating, hosting, maintaining, and deploying computer-readable program code in the computer system, wherein the computer-readable program code in combination with the computer system is configured to implement the receiving, the selecting, the designating, the time-shifting, the modifying, and the training.

9. A computer program product, comprising a computer-readable hardware storage device having a computer-readable program code stored therein, the program code configured to be executed by a machine-learning system comprising a processor, a memory coupled to the processor, and a computer-readable hardware storage device coupled to the processor, the storage device containing program code configured to be run by the processor via the memory to implement a method for machine learning with segment-aligned multisensor trace data, the method comprising:

the machine-learning system receiving, from a set of sensors, a set of time series from a set of sensors that each comprises a chronological sequence of measurements of an attribute, of a set of attributes of a mechanical assembly unit, of an instance, of a set of instances of measured entities;

the machine-learning system selecting for each received time series a corresponding initial segmentation method of a set of segmentation methods, where a first selected initial segmentation method partitions measurements comprised by a corresponding first time series of the received time series into a first sequence of at least two contiguous target segments, and where the first selected initial segmentation method determines a number of segments in the first sequence and the number of measurements comprised by each segment of the first sequence;

the machine-learning system designating one series of the received time series to be a first standard series for a first attribute of the set of attributes, where the first standard series comprises measurements of the first attribute;

the machine-learning system time-shifting measurements of each target series of the set of received time series, such that each time-shifted measurement is time-aligned with a corresponding measurement of the first standard series, where measurement of each target series is a measurement of the first attribute, where the time-shifting aligns each target series to the first standard series by performing a method of dynamic time warping (DTW), and where the machine-learning system determines that a first target segment of the first target series, of the set of received time series, should be segment-aligned to a first standard segment of the first standard series by determining that a number of measurement points of the first target segment that have been aligned by the DTW procedure to any measurement point of the first standard segment is at least as large as a number of measurement points of any other segment of the first target series that have been aligned by the DTW procedure to any measurement point of the first standard segment;

the machine-learning system modifying a corpus configured to train a self-learning application by incorporating each segment-aligned series into the corpus, said corpus being a data storage device;

the machine-learning system training the self-learning application by submitting the modified corpus to the self-learning application, wherein said training the self-learning application comprises: (i) using training data to perform the training, said training data comprising each time-shifted measurement that is time-aligned with the corresponding measurement of the first standard series, (ii) teaching the self-learning application to make a prediction of a likely failure of the mechanical assembly unit's functional quality-assurance test, wherein said making the prediction is in response to the self-learning application identifying adverse conditions, as measured by the set of sensors, on the set of attributes of the mechanical assembly unit as the mechanical assembly unit leaves an assembly line of a manufacturing process that manufactured the mechanical assembly unit, and (iii) gaining experience, by the self-learning application, that allows the self-learning application to infer a semantic meaning from behavior of the set of attributes of the mechanical assembly unit as the mechanical assembly unit leaves the assembly line and to use the inferred semantic meaning to predict the likely failure of the mechanical assembly unit's functional quality-assurance test; and executing the trained self-learning application using the inferred semantic meaning to predict the likely failure of the mechanical assembly unit's functional quality-assurance test, wherein the machine-learning system uses a method of Lavielle to select an initial segmentation method for each received time series, wherein the selection of each initial segmentation method comprises: using the method of Lavielle to assign a contrast-function value to each received time series, and determining an optimal number of segments L into which a particular received time series should be segmented by choosing a smallest value of L for which a second derivative of the particular received time series' contrast function is greater than a threshold S.

10. The computer program product of claim 9, where the time-shifting the first target series to the first standard series further comprises:

the machine-learning system using a method of dynamic time warping (DTW) to time-align a chronologically earliest measurement of the first target series to a chronologically earliest measurement of the first standard series, and the machine-learning system using a method of dynamic time warping (DTW) to time-align a chronologically last measurement of the first target series to a chronologically last measurement of the first standard series.

11. The computer program product of claim 9, where the designating the one series to be a first standard series for a first attribute further comprises:

the processor selecting a subset of the received time series, where each time series of the subset comprises a chronological sequence of measurements of the first attribute;

the processor tabulating a number of segments into which each time series of the subset is divided by a corresponding initial segmentation method selected for that time series;

the processor identifying a mode of the first attribute, where the mode of the first attribute is a number of segments most often identified by the tabulated numbers of segments;

the processor associating each instance of the set of instances with a corresponding group of time series, where each series of a group corresponding to a first instance of the set of instances: i) comprises measurements of an attribute, of the set of attributes, of the first instance, and ii) is segmented by a corresponding initial segmentation method into the number of segments identified by the mode of the first attribute;

the processor identifying a standard instance of the first attribute to be an instance, of the set of instances, that is associated with a corresponding group that comprises a largest number of time series; and the processor choosing the first standard series to be a time series of the received time series that comprises measurements of the first attribute of the standard instance.

* * * * *